A. W. WEIKERT & J. PETTIBONE.
SELF LOCKING JUNCTION BOX COUPLING.
APPLICATION FILED FEB. 6, 1914.

1,106,761. Patented Aug. 11, 1914.

Witnesses
Marshall Low

Inventors
A. W. Weikert and
J. Pettibone
By Moore + Clarke
Attorneys

UNITED STATES PATENT OFFICE.

ALVIN W. WEIKERT AND JAMES PETTIBONE, OF WASHINGTON, DISTRICT OF COLUMBIA.

SELF-LOCKING JUNCTION-BOX COUPLING.

1,106,761.

Specification of Letters Patent. Patented Aug. 11, 1914.

Application filed February 6, 1914. Serial No. 816,994.

*To all whom it may concern:*

Be it known that we, ALVIN W. WEIKERT and JAMES PETTIBONE, citizens of the United States, residing at Washington, in the District of Columbia, have invented certain new and useful Improvements in Self-Locking Junction-Box Couplings, of which the following is a specification.

This invention relates to a self-locking junction box coupling, particularly adapted for connecting the terminal of an electric conduit with a junction box or the like.

The object of the invention is to provide a simple, inexpensive, easily operated, efficient, durable, strong and reliable junction box coupling.

With the foregoing and other objects in view, which will appear as the description proceeds, the invention resides in the combination and arrangement of parts, and in the features and details of construction, hereinafter described and claimed, it being understood that changes in the combination and details of the invention may be made within the scope of the claims without departing from the spirit of the invention, and that the variations in the claims are intended to indicate permissible variations in the invention.

The embodiment of invention herein disclosed preferably comprises easily manipulated means for securing the coupling in position on a conduit and automatically acting means for locking the coupling in the junction box.

The means for securing the coupling to the conduit preferably comprises a plurality of movable grippers and a contractible ring or band surrounding the grippers for holding them in engagement with the conduit.

The automatic means for locking the coupling to the junction box preferably includes one or more spring grippers, adapted to be moved inwardly during the insertion of the coupling into the opening of the junction box and to move automatically outward to lock the coupling in the junction box.

The invention also comprises adjustable means adapted to be tightened against the outside of the junction box to hold the coupling in position and to provide a contact by which any stray currents or leaks may be grounded through the junction box.

Figure 1:
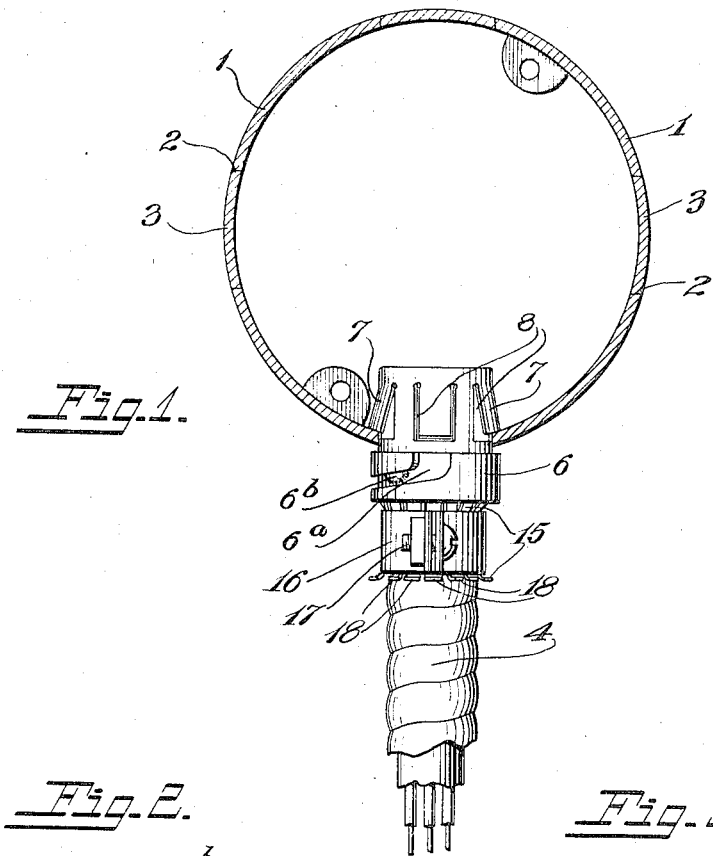
Figure 2:
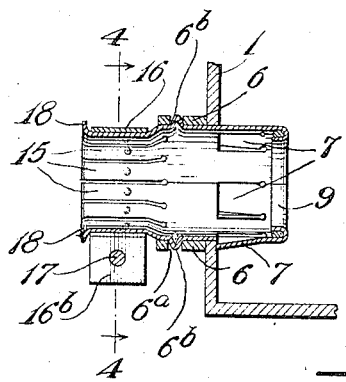
Figure 3:
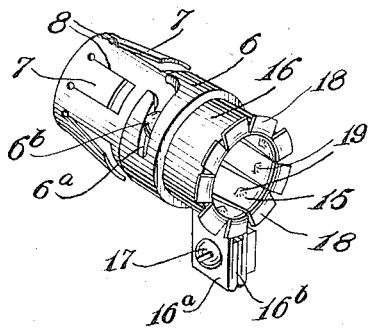
Figure 4:
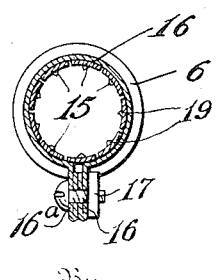

In the accompanying drawing, forming part of this specification,—Figure 1 is a horizontal section, partly in elevation, showing a circular junction box with the forward end of the coupling thrust through the opening therein, the spring grippers being in expanded position to lock the coupling in the box, the conduit grippers at the outer end of the coupling being locked in engagement with the conduit, and the adjustable collar at the center of the coupling being in position to be tightened against the junction box. Fig. 2 is a longitudinal section through the coupling. Fig. 3 is a perspective view of the improved coupling. Fig. 4 is a transverse sectional view on the plane indicated by the line 4—4 of Fig. 2.

Like reference numerals indicate corresponding parts in the different figures of the drawing.

The junction box is indicated definitely by the numeral 1. This junction box is provided with the usual conduit openings 2, each of which is normally closed by a frictionally held disk 3 adapted to be punched out when a conduit terminal is to be inserted.

The conduit terminal in Fig. 1 is indicated by the numeral 4. It has applied to the end thereof one of the improved junction box couplings of this invention, the rear or outer end of the coupling being locked in position on the conduit 4, and the forward or inner end of the coupling being automatically locked against withdrawal within the junction box, having been merely pushed through the opening, the spring grippers contracting during the operation and then expanding into locked position after the coupling has been fully inserted.

The coupling of the present invention, preferably, although not essentially, is formed from a metal blank rolled or bent into substantially the form of a longitudinally split tube. In Fig. 2 the longitudinal split or seam of the tubular body is indicated by the numeral 5. The tubular body is rolled together so that this split or seam is practically closed. In the preferred embodiment of the invention, the box-gripping means preferably consists of two sets of elements, first, the adjustable collar 6, which rotatably surrounds the central portion of the body and is formed with cam slots $6^a$, which are engaged by inclined lugs $6^b$ formed preferably by slitting, and punching outward, portions of the body, so that when the collar 6 is rotated, it is moved up against the face of the junction box, so as to make a close contact therewith, and second, movable grippers 7, which, in this form of the invention, consist of spring plates cut or separated from the tubular body portion of the coupling on three sides, by means of the U-shaped slots 8, the free ends of the grippers being directed toward the collar 6 and being normally sprung slightly outward at their free ends, as shown. The inner end of the coupling preferably is turned or rolled inward in the form of an annular flange, as shown at 9, thus providing a continuous circular portion for evenly surrounding the conduit and preventing fraying or abrasion thereof.

The means for locking the coupling to the conduit preferably comprises a plurality of longitudinally extending grippers 15 and a band 16 surrounding the grippers for forcing them into contact with the conduit. The band 16 preferably is formed of terminals which are extended outward, as indicated at 16$^a$, and inward, as indicated at 16$^b$, to provide spring means for normally holding the terminals apart. Extending through these terminals is a bolt 17, provided with a nut, by means of which the terminals may be drawn together, so as to contract the band 16 in diameter, and thus force the grippers 15 tightly into engagement with the casing of the conduit 4. The ends of the grippers 15 preferably are extended radially outward, as indicated at 18, to hold the band 16 in place, and said grippers 15 are also provided with inwardly extending teeth 19, which bite into the conduit.

The operation of the device is as follows: The end of the conduit which is to be carried into the junction box is fitted into the outer end of the coupling and passes readily between the grippers 15. The bolt 17 is then tightened to contract the ring 16 and lock the coupling on the conduit. The forward end of the coupling is then thrust through the desired opening in the junction box. As the grippers 7 pass through the opening in the junction box, they are forced inwardly, and when the device is entirely inserted, the grippers 7 spring outwardly and lock the coupling firmly in the junction box. The collar 6 is then turned and thus tightened against the outer face of the junction box, so as to hold the coupling firmly in position and provide a contact by which any stray currents or leaks may be grounded through the junction box.

It will be observed that the coupling of the present invention is strong, simple, durable and inexpensive in construction, as well as thoroughly efficient in operation, and that it is capable of being easily and quickly applied first to the conduit and second to the junction box.

What is claimed as new is:

1. A junction box coupling carrying inwardly yieldable spring arms for engaging the inner surface of a wall of the junction box, adjustable means for engaging the outer surface of said wall, and means for gripping a conduit.

2. A junction box coupling comprising a tubular body having outwardly movable spring locking members for the junction box, inwardly movable spring locking members for the conduit, a band surrounding said conduit locking members, and having the terminals thereof bent outwardly and then inwardly, a bolt extending through said terminals and provided with a nut, a plurality of out-struck lugs on said tubular body, and a collar surrounding said tubular body and having cam slots therein engaging said lugs for the purpose specified.

In testimony whereof we affix our signatures in presence of two witnesses.

ALVIN W. WEIKERT.
JAMES PETTIBONE.

Witnesses:
J. K. MOORE,
E. B. MOORE.